(12) United States Patent
Rüffer et al.

(10) Patent No.: US 11,535,220 B2
(45) Date of Patent: Dec. 27, 2022

(54) FLUID CONTAINER HAVING A RELEASABLE CONNECTION TO A VEHICLE COMPONENT

(71) Applicant: Continental Teves AG & Co. oHG, Frankfurt am Main (DE)

(72) Inventors: Manfred Rüffer, Sulzbach (DE); Horst Krämer, Ginsheim-Gustavsburg (DE); Kerima Mertz, Birkenau (DE); Milan Jagos, Jicin (CZ); Paul Wiebe, Weiterstadt (DE)

(73) Assignee: Continental Teves AG & Co. oHG

( * ) Notice: Subject to any disclaimer, the term of this patent is extended or adjusted under 35 U.S.C. 154(b) by 281 days.

(21) Appl. No.: 16/644,194

(22) PCT Filed: Jun. 21, 2018

(86) PCT No.: PCT/EP2018/066526
§ 371 (c)(1),
(2) Date: Mar. 4, 2020

(87) PCT Pub. No.: WO2019/048103
PCT Pub. Date: Mar. 14, 2019

(65) Prior Publication Data
US 2020/0384970 A1   Dec. 10, 2020

(30) Foreign Application Priority Data

Sep. 7, 2017   (DE) .................... 10 2017 215 833.6

(51) Int. Cl.
*B60T 11/26*   (2006.01)
*B60T 13/14*   (2006.01)
(Continued)

(52) U.S. Cl.
CPC ............. *B60T 13/142* (2013.01); *B60T 11/26* (2013.01); *B60T 17/06* (2013.01); *F16B 21/071* (2013.01); *F16B 21/075* (2013.01)

(58) Field of Classification Search
CPC .......... B60T 11/22; B60T 11/26; B60T 17/06; B60T 13/5675
(Continued)

(56) References Cited

U.S. PATENT DOCUMENTS 5,580,204 A   12/1996 Hultman
5,946,914 A    9/1999 Crumb et al.
(Continued)

FOREIGN PATENT DOCUMENTS

CN   106015310 A   10/2016
DE   10047325 A1    4/2002
(Continued)

OTHER PUBLICATIONS

German Search Report for German Application No. 10 2017 215 833.6, with partial translation, dated Aug. 23, 2018, 11 pages.
(Continued)

*Primary Examiner* — Dustin T Nguyen
*Assistant Examiner* — Michael Quandt
(74) *Attorney, Agent, or Firm* — RatnerPrestia

(57) ABSTRACT

A fluid container for releasable connection to a vehicle component, wherein the fluid container has at least one fastening lug with an opening which is aligned with a plug-through opening in the vehicle component and the connection is secured by a locking pin which can be extended into the plug-through opening and the opening and/or opening and can be locked in an end position by a rectilinear plug-in movement in a plug-in direction; in order to increase the load-bearing capacity of the connection and to simplify the installation, it is proposed that the fastening (Continued)

lug has a locking device which is arranged in alignment with the respective opening and the locking device includes at least two elastically resilient tabs which act in a latching manner on a thickened locking portion of the locking pin and thereby secure the locking pin in its axial direction.

11 Claims, 3 Drawing Sheets

(51) Int. Cl.
  *B60T 17/06* (2006.01)
  *F16B 21/07* (2006.01)
(58) Field of Classification Search
  USPC .......................................................... 60/585
  See application file for complete search history.

(56) References Cited

U.S. PATENT DOCUMENTS

| | | | |
|---|---|---|---|
| 6,113,301 A | 9/2000 | Burton | |
| 7,441,408 B2* | 10/2008 | Bourlon | B60T 17/06 60/585 |
| 9,199,619 B2 | 12/2015 | Neumann et al. | |
| 9,663,091 B2* | 5/2017 | Lange | B60T 11/22 |
| 9,976,587 B2 | 5/2018 | Heimann et al. | |
| 2016/0123363 A1 | 5/2016 | Hammer et al. | |

FOREIGN PATENT DOCUMENTS

| | | |
|---|---|---|
| DE | 10217682 A1 | 11/2003 |
| DE | 102007041500 A1 | 3/2009 |
| EP | 0994262 A2 | 4/2000 |
| EP | 2459425 A2 | 6/2012 |
| GB | 923490 | 4/1963 |
| JP | 09286318 A | 11/1997 |
| JP | 2003335236 A | 11/2003 |
| JP | 2004316637 A | 11/2004 |

OTHER PUBLICATIONS

International Search Report and Written Opinion for International Application PCT/EP2018/066526, dated Sep. 13, 2018, 10 pages.
Chinese Office Action for Chinese Application No. 201880057893.X, dated Sep. 3, 2021 with translation, 17 pages.
Japanese Notice of Reasons for Refusal for Japanese Application No. 2020-513846, dated Feb. 18, 2022 with translation, 9 pages.
Brazilian Office Action for Brazilian Application No. 112020004117-3, dated Sep. 7, 2022 with partial translation, 7 pages.
Japanese Decision to Grant a Patent for Japanese Application No. 2020-513846, dated Sep. 21, 2022 with translation, 3 pages.

* cited by examiner

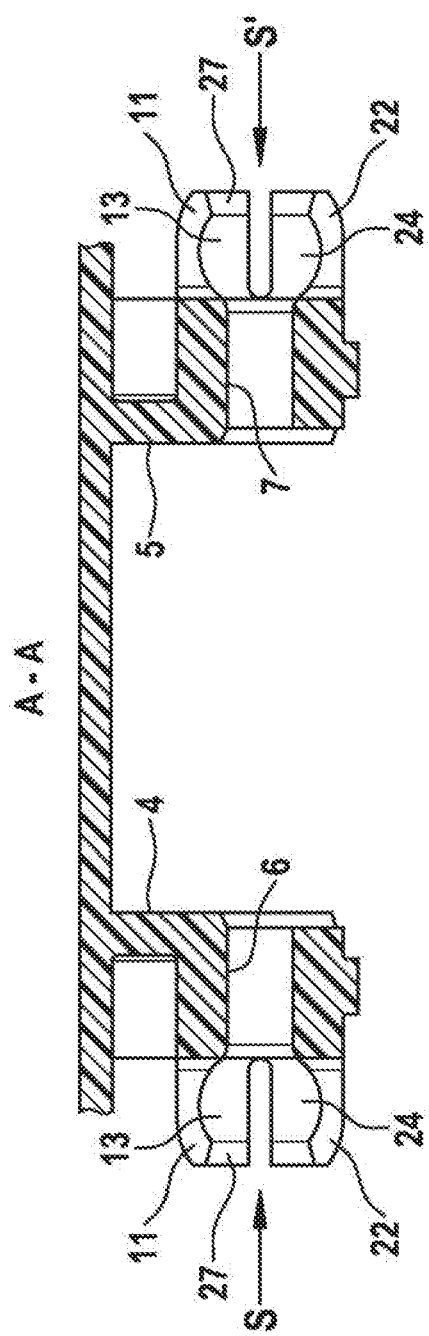
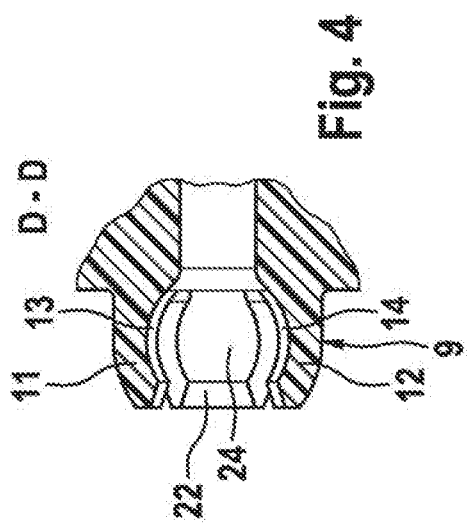
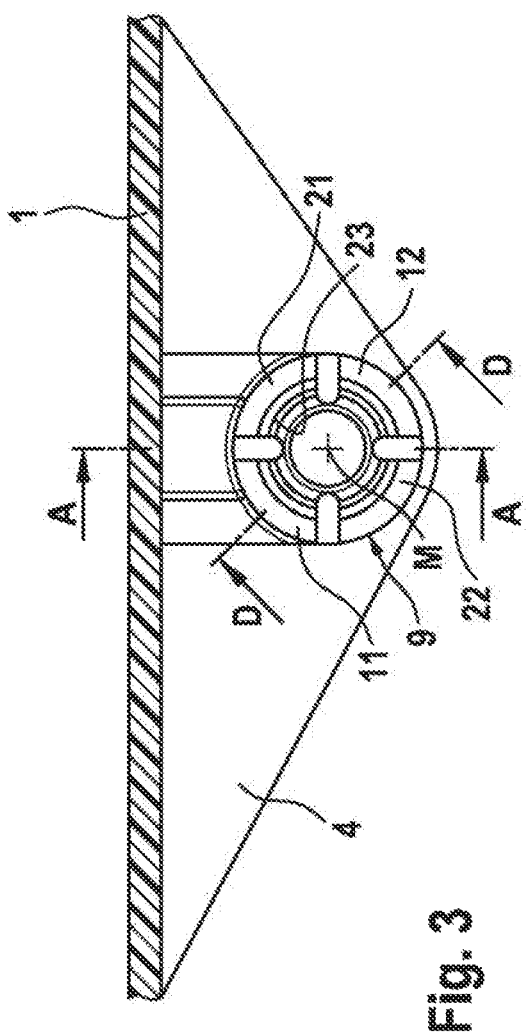

FLUID CONTAINER HAVING A RELEASABLE CONNECTION TO A VEHICLE COMPONENT

CROSS REFERENCE TO RELATED APPLICATIONS

This application is the U.S. National Phase Application of PCT International Application No. PCT/EP2018/066526, filed Jun. 21, 2018, which claims priority to German Patent Application No. 10 2017 215 833.6, filed Sep. 7, 2017, the contents of such applications being incorporated by reference herein.

FIELD OF THE INVENTION

The invention relates to a fluid container for releasable connection to a vehicle component. Fluid containers of this type are used, for example, as pressure medium containers for hydraulic motor vehicle brake systems where they serve both for supplying classic master brake cylinders coupled to a separate booster stage, and combined pressure-generating units containing the booster stage in an integrated manner.

BACKGROUND OF THE INVENTION

Fluid containers of the type in question are fastened directly to the hydraulic unit. To secure the fluid container in its intended position on the unit, it is known to use a locking pin which is plugged through aligned openings on the container and the vehicle component. For simplified installation, the locking pin should also be installed and secured with short cycle times and as far as possible without separate tools or devices, and complex and fault-prone solutions with screw threads, clamping sleeves and the like should also be avoided.

DE 10 047 325 A1, incorporated herein by reference, discloses an assembly in which the fluid container is secured by a metal pin with an orthogonally angled lug. It is considered a disadvantage that, in order to lock the metal pin, its angled lug has to be introduced between two spring strips or into a latching insert and, for this purpose, is intended to be rotated into a very specific position with exacting tolerances. This additional operation makes blind installation difficult and increases the outlay on monitoring to avoid erroneous installations.

EP 2 459 425 B1, incorporated herein by reference, discloses an assembly with a compensating container and a fastening pin made from plastic, which is locked in the plug-in direction by a simple axial plug-in movement. For this purpose, the fastening pin has a head flange as a stop and, moreover, one or more latching elements which interact with a force-fit or form-fit with one of the openings on the fastening lugs of the compensating container. It is considered a disadvantage here that multiple reuse of the fastening pin, for example in the event of servicing, is possible only to a limited extent due to the wear of the latching elements; in addition, the load-bearing capacity of the fastening pin at high transverse loads—for example in the event of a crash—is considered to be in need of improvement.

SUMMARY OF THE INVENTION

An aspect of the invention therefore is an improved fluid container which, even under high loads and when using collarless container stubs, remains reliably secured to the vehicle component, and which can be used in right-hand drive and left-hand drive vehicles and the installation of which, in particular blind installation by hand and automated machine installation, can be undertaken repeatedly simply and in an unlimited number of times, with reusable components.

An aspect of the invention makes provision for the fastening lug to have a locking device which is arranged in alignment with the respective opening and for the locking device to comprise at least two elastically resilient tabs which act in a latching manner on a thickened locking portion of the locking pin and thereby secure the locking pin in its axial direction. This permits a robust construction which is particularly simple to install and does not require separate positioning of the component during the installation. A simple through hole is sufficient for this in the vehicle component. This also promotes clear haptic and visual monitoring of the correct fit of the locking pin.

According to a development of the invention, the tabs have concave, preferably spherical, surface portions, which, for locking the locking pin, simultaneously interact with a corresponding, convex surface portion of the locking pin. This permits an unambiguous, wobble-free final positioning of the components with reduced installation forces and the components can be designed to be particularly robust mechanically.

The ease of servicing is also increased, the installation and removal can be carried out rapidly and as often as required, without a tool and automatically, or with simple aids.

According to a preferred embodiment, two locking devices are provided on the fluid container, which locking devices are arranged substantially mirror-symmetrically opposite each other such that the plug-in direction can optionally be reversed and installation on both sides is always possible. This enables an inexpensive, standardized solution to be implemented that can be used unchanged in various areas of use and applications—for example, right-hand drive and left-hand drive versions.

An aspect of the invention also makes provision for the locking pin to be preferably rotationally symmetrical and to comprise an elongated body with a front end which, for the locking, is plugged through the plug-through opening in the vehicle component, and the thickened locking portion is formed substantially in the region of an opposite, rear end. As a result, the locking pin can be produced particularly simply and cost-effectively from metal or plastic, erroneous installation is inevitably avoided, automated installation and simple removal are promoted and the construction space required is reduced.

According to an advantageous development, the surface portion of the locking portion directed in the plug-in direction can be spherical, preferably can be designed as a spherical segment, particularly preferably as a hemisphere. This makes it possible to realize a play-free assembly with particularly low installation forces and wear.

A preferred embodiment of the locking pin makes provision for a shoulder directed radially substantially with respect to the body to be provided on the flat side of the spherical segment, and for a transition between the shoulder and the body to be beveled, in particular conical. This increases the press-out force against inadvertent loss of the locking pin and thus increases the locking security and at the same time improves the producibility with forming processes by reducing the number of steps.

According to another embodiment of the invention, the locking portion can be designed as a spherical head, as a result of which the locking pin can be designed in a particularly space-saving manner and, moreover, the removal force and susceptibility to wear are reduced.

According to a preferred embodiment, the fluid container can be provided as a brake fluid container and the vehicle component as a hydraulic unit for generating the hydraulic brake pressure, in particular a master brake cylinder, for a hydraulic motor vehicle brake system.

This permits a particularly robust and crash-proof construction of the safety-relevant brake assembly in a particularly cost-effective manner, because, for example, no holding function is thus shifted any longer to the connection stubs of the fluid container and they can therefore be realized in a simple manner without a collar. The diameter of hydraulic intersections of this type can also be reduced as a result.

Furthermore, an aspect of the invention claims an assembly comprising a fluid container according to an aspect of the invention and at least one locking pin according to an aspect of the invention, which assembly combines the aforementioned advantages.

BRIEF DESCRIPTION OF THE DRAWINGS

Further features, advantages and possible uses of aspects of the invention emerge from the description below of an exemplary embodiment according to the invention. In this connection:

FIG. 2 shows a sectional illustration of a detail of the fluid container according to FIG. 1 with two locking devices.

FIG. 3 shows a top view of a locking device according to FIG. 2.

FIG. 4 shows an enlarged sectional illustration D-D of the locking device according to FIG. 3.

DETAILED DESCRIPTION OF THE PREFERRED EMBODIMENTS

FIG. 1

Figure 1:
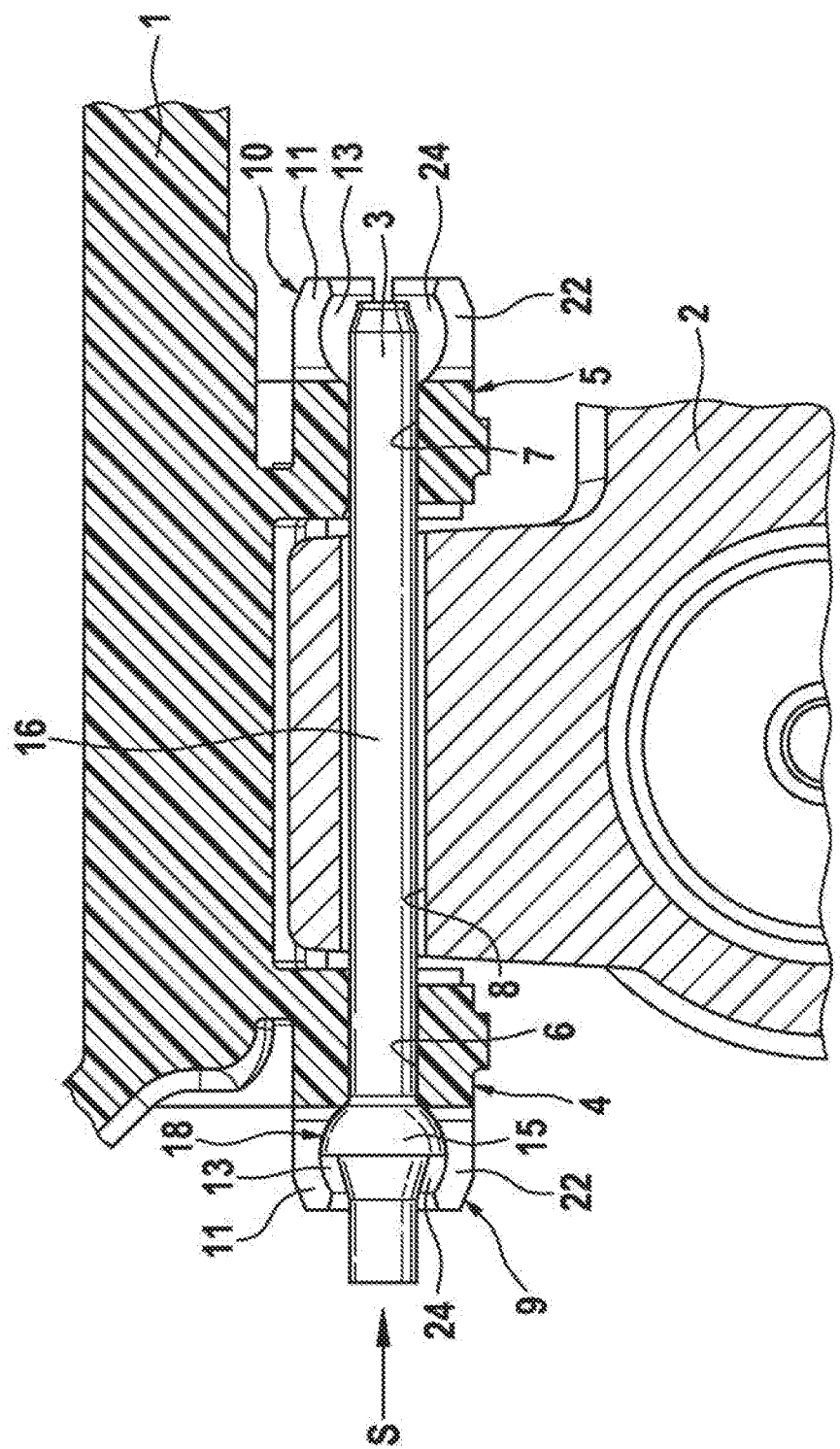
FIG. 1 shows a detail of an embodiment of an assembly of a master brake cylinder and a fluid container according to an aspect of the invention mounted thereon and a locking pin in a sectional illustration.

In the embodiment shown, the fluid container 1 according to an aspect of the invention is designed as a pressure medium container of a hydraulic motor vehicle brake system and is arranged directly on a master brake cylinder (vehicle component 2).

The connection to the vehicle component 2 is designed to be releasable and is secured by a locking pin 3, which can be fitted or removed an unlimited number of times. For this purpose, the vehicle component 2 has a plug-through opening 8 and the fluid container 1 has two fastening lugs 4 and 5, which are arranged on both sides of the plug-through opening 8 and each have an opening 6 or 7 aligned with the plug-through opening 8. The openings 6, 7 are of elongated cylindrical design in the axial direction and therefore there is a sufficient contact area with the locking pin 3. This ensures adequate strength at higher transverse forces, and in particular the exceeding of the limit values for surface pressure of the plastics material of the fluid container 1, and therefore damage thereof, is avoided.

The locking pin 3 extends through the openings 6, 7, 8 and thereby secures the fluid container 1 in its intended fitted position on the vehicle component 2. At the same time, the locking pin 3 itself is secured in its end position by a latching lock in a locking device 9 on the fluid container 1. Each locking device 9, 10 is respectively assigned to one of the openings 6 and 7 and is aligned therewith.

As can be gathered in particular from FIGS. 2-4 below, the locking devices 9, 10 each have 4 elastically resilient tabs 11, 12, 21, 22 in the embodiment shown.

A different number of tabs is permissible at any time within an aspect of the invention. The number of 3 or 4 tabs per locking device is considered to be particularly preferred, however, because an optimal compromise between manufacturing outlay, installation force, holding force and securing of the locking pin 3 can thus be achieved particularly simply even if one or even two tabs lose their function (for example breakage).

Each tab 11, 12, 21, 22 in each case has a radially inwardly directed, respectively spherically concave surface portion 13, 14, 23, 24, forming an axial undercut. The aforementioned surface portions 13, 14, 23, 24 encompass a thickened locking portion 18 of the locking pin 3 and secure the latter in the axial direction with a force-fit and form-fit by means of the radial prestress and axial undercut.

The thickened locking portion 18 of the locking pin 3 has a convex surface portion 15 which is directed in the plug-in direction S and, together with the surface portions 13, 14, 23, 24, defines the axial stop and end position of the locking pin in the assembly.

A deviation from the spherical surface to another concave surface of the surface portions 13, 14, 23, 24 (or correspondingly convex surface portion 15 of the locking pin 3) is, of course, permissible within an aspect of the invention.

For the locking, the locking pin 3 has merely to be plugged axially in a straight line in the plug-in direction S as far as the stop or contact of the surface portion 15 against the surface portions 13, 14, 23, 24.

For improved standardization and capability of mounting on both sides, the two fastening lugs 4, 5 are equipped with locking devices 9, 10 that can be operated identically and are preferably designed mirror-symmetrically or identically. By this means, the same locking pin 3 can be plugged in and locked as desired from both sides without a functional restriction. It is locked in the locking device 9 in the plug-in direction S and in the locking device 10 in the plug-in direction S'.

FIG. 2

To clarify the construction of the locking devices 9, 10 described above, the corresponding detail of the fluid container 1 is shown by itself in FIG. 2, without being assembled. It should be particularly emphasized that formation of the axial undercut by means of spherically concave surface portions 13, 14, 23, 24 enables the locking pin 3 to be reliably held axially, to be unambiguously centered radially and, at the same time, to be removed more easily without being damaged. To further facilitate the installation, the tabs 11, 12, 21, 22 each have an introducing slope 27.

FIG. 3

FIG. 3 shows a top view (corresponding to the plug-in direction S from FIG. 2) of the fastening lug 4 with the locking device 9 formed thereon. It can be seen that each tab is curved in the circumferential direction. If at least two and preferably 3 or 4 tabs are used, a loss of one tab or even a plurality of tabs becomes uncritical because the locking pin 3 can already be held in its axial end position by a single tab.

FIG. 4

The sectional view D-D from FIG. 3 clarifies the construction of the locking device.

FIG. 5

Figure 5:
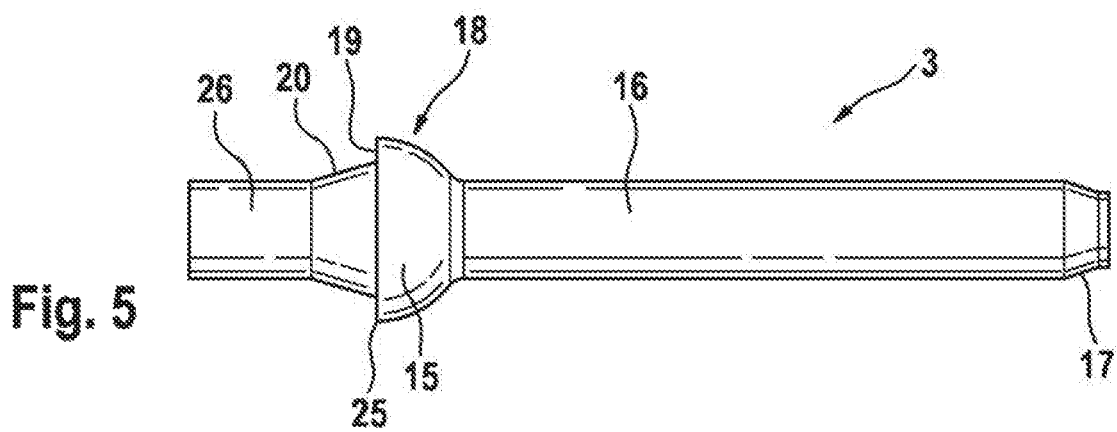
FIG. 5 shows an embodiment according to an aspect of the invention of the locking pin according to FIG. 1.

FIG. 5 illustrates a first embodiment according to the invention of the locking pin 3 according to FIG. 1. The locking pin 3 is preferably constructed rotationally symmetrically from a metal material, in particular steel. Weight-saving plastics designs, in particular made of a fiber-reinforced plastics material, are also permissible for lower load cases within an aspect of the invention.

The locking pin 3 has on its front side an elongated body 16 with a beveled tapered front end 17 which, for locking, is plugged through the plug-through opening 8 in the vehicle component 2. Substantially in the region of an end opposite the front end 17, a locking portion 18 is formed in a thickened manner on the body 16, said locking portion being locked in the locking device 9, 10 of the fluid container 1.

A surface portion 15 of the locking portion 18 directed toward the front end 17 in the plug-in direction is designed to be spherically convex in a manner corresponding to the surface portions 13, 14, 23, 24 of the tabs 11, 12, 21, 22, specifically as a spherical segment in the embodiment shown.

A shoulder 19 directed radially substantially with respect to the body 16 is provided on the flat side of the spherical segment. The shoulder substantially serves to increase the axial resistance counter to the respective plug-in direction S, S' or the press-out force against an inadvertent loss of the locking pin 3 and thus to increase the locking security.

A transition 20 between the shoulder 19 and the body 16 is beveled, in particular conical, which creates a type of stepped cone and in particular makes it easier to produce the locking pin 3 in a metal design, for example by means of cold forming.

An elongated lug 26 adjoins the locking portion 18 on the rear side. The lug 26 serves in particular to hold the locking pin 3 with fingers or automatic grippers for simplified installation, and in addition as a reliable visual option for monitoring the correct fit of the locking pin 3 in the assembly.

FIG. 6

Figure 6:
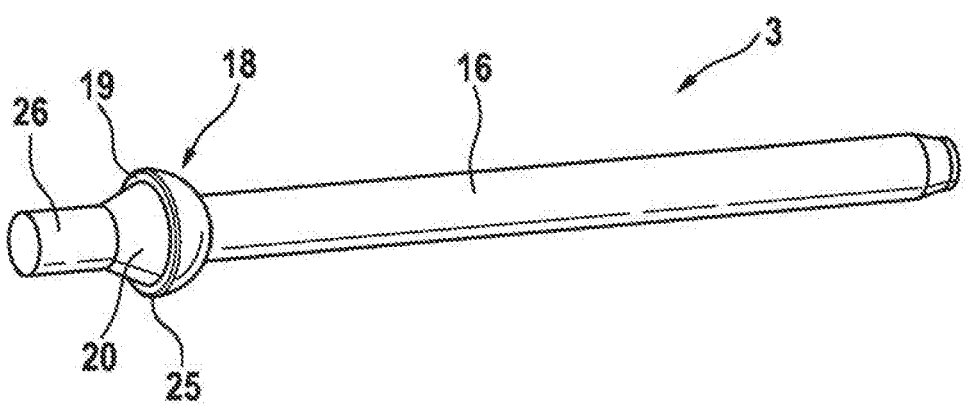
FIG. 6 shows a second embodiment according to the invention of the locking pin in a spatial illustration.
Figure 7:
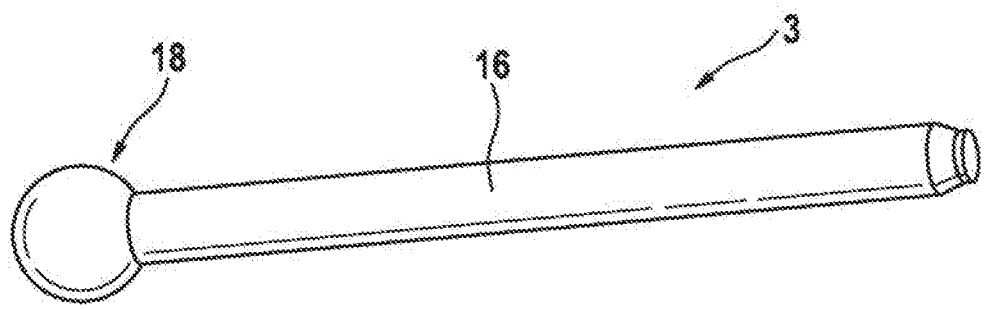
FIG. 7 shows a third embodiment according to the invention of the locking pin in a spatial illustration.

FIG. 6 illustrates a second embodiment according to the invention of the locking pin 3. In contrast to the embodiment according to FIG. 5, the outer radial edge 25 of the shoulder 19 is rounded in order to simplify removal.

FIG. 7

In contrast to the embodiments according to FIGS. 5 and 6, in the third embodiment according to the invention of the locking pin 3 that is shown, the locking portion 18 is designed as a spherical head and the lug 26 is missing. An embodiment of this type can be advantageous, for example, when construction space conditions are particularly tight, and also for laying lines in the immediate vicinity of the locking device, in order to prevent damage to the line by the lug 26.

FIG. 8

Figure 8:
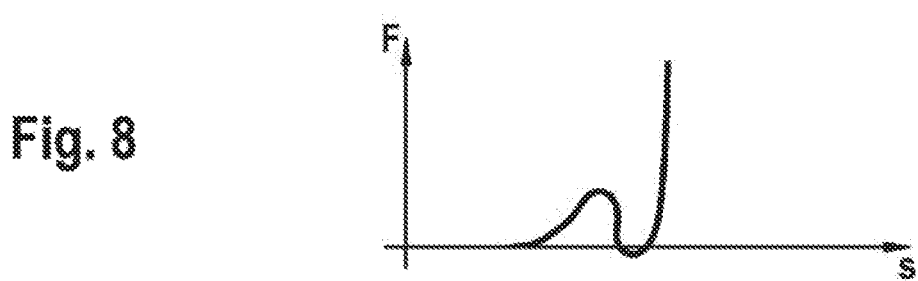
FIG. 8 shows a schematic diagram of a force-displacement diagram of an axial force acting on the locking pin counter to the plug-in direction.

FIG. 8 shows, in a highly simplified manner, a force-displacement diagram during installation of the locking pin 3. The locking of the locking pin 3 in the locking device 9, 10 takes place automatically and is unambiguously recognizable by a characteristic course of the resistance force during the installation. In this case, when the tabs 11, 12, 21, 22 are elastically expanded by the surface portion 15, with a prestressing force being formed, a first force peak initially arises. This is followed by a decrease in force, culminating in the acceleration in the plug-in direction when the tabs 11, 12, 21, 22, after moving over the introducing slope 27, spring back with the locking portion 18. When the surface portion 15 strikes against the surface portions 13, 14, 23, 24, the locking pin 3 reaches its end position, accompanied by a strong second, final increase in force.

By this means, the installation of the locking pin 3 can be implemented both as a purely haptically controllable blind operation and as an automated force-sensor-controlled operation.

LIST OF REFERENCE SIGNS

1 Fluid container
2 Vehicle component
3 Locking pin
4 Fastening lug
5 Fastening lug
6 Opening
7 Opening
8 Plug-through opening
9 Locking device
10 Locking device
11 Tab
12 Tab
13 Surface portion
14 Surface portion
15 Surface portion
16 Body
17 Front end
18 Locking portion
19 Shoulder
20 Transition
21 Tab
22 Tab
23 Surface portion
24 Surface portion
25 Edge
26 Lug
27 Introducing slope
S Plug-in direction
S' Plug-in direction
M Center axis

The invention claimed is:

1. A fluid container for releasable connection to a vehicle component, wherein the fluid container has at least one fastening lug with an opening which is aligned with a plug-through opening in the vehicle component and the connection is secured by a locking pin which can be extended into the plug-through opening and the opening and can be locked in an end position by a rectilinear plug-in movement in a plug-in direction, wherein the at least one fastening lug has a locking device which is arranged in alignment with the respective opening and the locking device comprises at least two elastically resilient tabs which act in a latching manner on a thickened locking portion of the locking pin such that each of the at least two elastically resilient tabs secure the locking pin against movement in both axial directions of the locking pin,
wherein the tabs each have concave surface portions which, for locking the locking pin, simultaneously interact with a corresponding, convex surface portion of the locking pin, and wherein the surface portions are spherical.

2. The fluid container as claimed in claim 1, wherein the locking device is designed to be substantially mirror-symmetrical such that the plug-in direction is reversible.

3. The fluid container as claimed in claim 1, wherein the fluid container is designed as a brake fluid container for a hydraulic motor vehicle brake system.

4. The fluid container as claimed in claim 1, wherein the locking pin is rotationally symmetrical.

5. A locking pin for a fluid container configured to be releasably connected to a vehicle component, wherein the fluid container has at least one fastening lug with an opening which is aligned with a plug-through opening in the vehicle component and the connection is secured by the locking pin which can be extended into the plug-through opening and the opening and can be locked in an end position by a rectilinear plug-in movement in a plug-in direction, wherein the at least one fastening lug has a locking device which is arranged in alignment with the respective opening and the locking device comprises at least two elastically resilient tabs which act in a latching manner on a thickened locking portion of the locking pin such that each of the at least two elastically resilient tabs secure the locking pin against movement in both axial directions of the locking pin, wherein the locking pin comprises:

an elongated body with a front end which, for locking, is plugged through the plug-through opening in the vehicle component, and the thickened locking portion is formed substantially in a region of an opposite, rear end, wherein the surface portion of the locking portion is spherical and directed in the plug-in direction.

6. The locking pin as claimed in claim 5, wherein the surface portion is substantially designed as a spherical segment.

7. The locking pin as claimed in claim 6, wherein a shoulder directed radially substantially with respect to the body is provided on a flat side of the spherical segment.

8. The locking pin as claimed in claim 7, wherein a transition between the shoulder and the body is beveled.

9. The locking pin as claimed in claim 5, wherein the locking portion is designed as a spherical head.

10. An assembly comprising:

a fluid container for releasable connection to a vehicle component, the fluid container comprising:

at least one fastening lug with an opening which is aligned with a plug-through opening in the vehicle component and the releasable connection is secured by a locking pin which can be extended into the plug-through opening and the opening and can be locked in an end position by a rectilinear plug-in movement in a plug-in direction, wherein the at least one fastening lug has a locking device which is arranged in alignment with the respective opening and the locking device comprises at least two elastically resilient tabs which act in a latching manner on a thickened locking portion of the locking pin such that each of the at least two elastically resilient tabs secure the locking pin against movement in both axial directions of the locking pin, and wherein the locking pin comprises an elongated body with a front end which, for the locking, is plugged through the plug-through opening in the vehicle component, and the thickened locking portion is formed substantially in the region of an opposite, rear end, wherein the tabs each have concave surface portions which, for locking the locking pin, simultaneously interact with a corresponding, convex surface portion of the locking pin, and wherein the surface portions are spherical.

11. The assembly as claimed in claim 10, wherein the vehicle component is a hydraulic unit for generating hydraulic brake pressure in a hydraulic motor vehicle brake system.

* * * * *